United States Patent [19]

Schwertner

[11] 4,135,349

[45] Jan. 23, 1979

[54] CROP SHREDDER APPARATUS AND ADAPTER

[76] Inventor: Larry V. Schwertner, Rte. 1, Ballinger, Tex. 76821

[21] Appl. No.: 772,074

[22] Filed: Feb. 25, 1977

[51] Int. Cl.² ............................................. A01D 75/30
[52] U.S. Cl. ............................................. 56/6; 56/503
[58] Field of Search ..................................... 56/503, 6

[56] References Cited

U.S. PATENT DOCUMENTS

| | | |
|---|---|---|
| 3,115,738 | 12/1963 | Engler ...................................... 56/6 |
| 3,135,079 | 6/1964 | Dunn ....................................... 56/6 |
| 3,608,284 | 9/1971 | Erdman .................................... 56/6 |

Primary Examiner—Russell R. Kinsey
Assistant Examiner—Daniel J. Leach
Attorney, Agent, or Firm—Hubbard, Thurman, Turner, Tucker & Glaser

[57] ABSTRACT

An adapter for use with rotary crop shredders and with a vehicle for towing the shredders. The resulting shredder apparatus is described as having a center shredder, directly behind the vehicle and shredders on each side of the center one. A center coupling assembly makes connections to the towing vehicle and to the center shredder. Extending from the center coupling assembly to each side shredder is a beam. A side coupling assembly connects each side shredder to the corresponding beam. The positions of the side shredders along the beams can be adjusted for best alignment with planted crop rows. The coupling assemblies, by providing considerable freedom of motion for the shredders, enable them to run over irregular ground. At the same time, means have been provided which permit the shredders to be raised for transport to and from a field.

10 Claims, 6 Drawing Figures

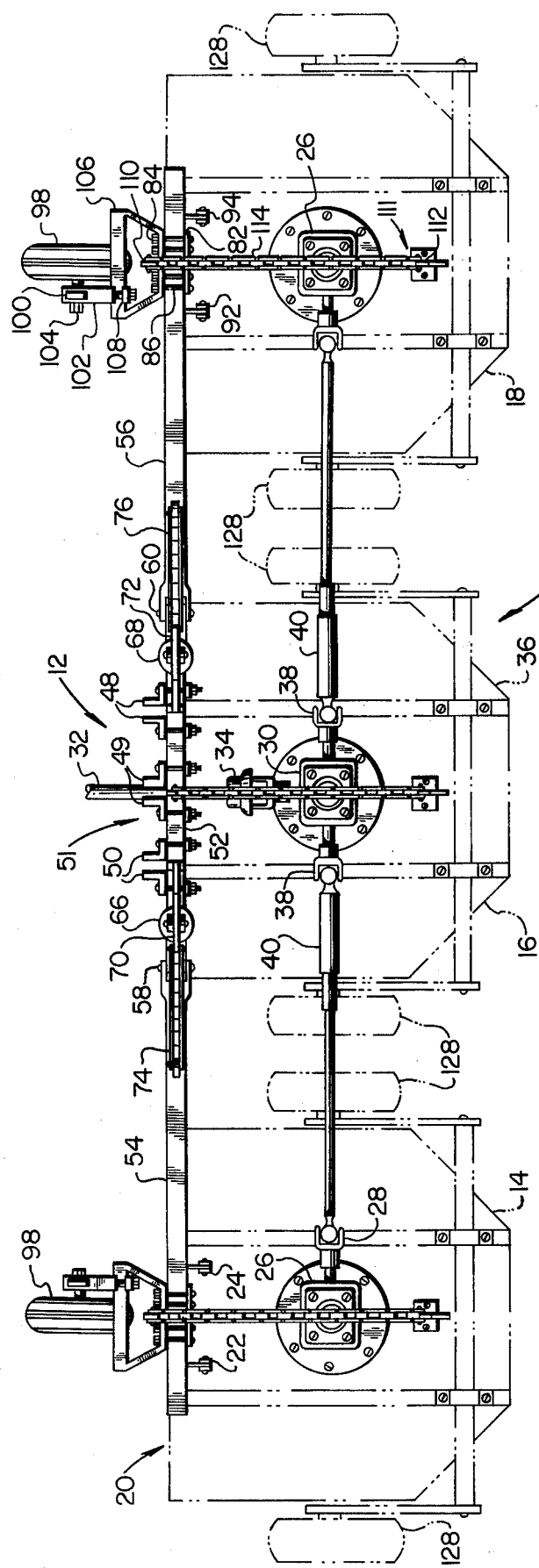
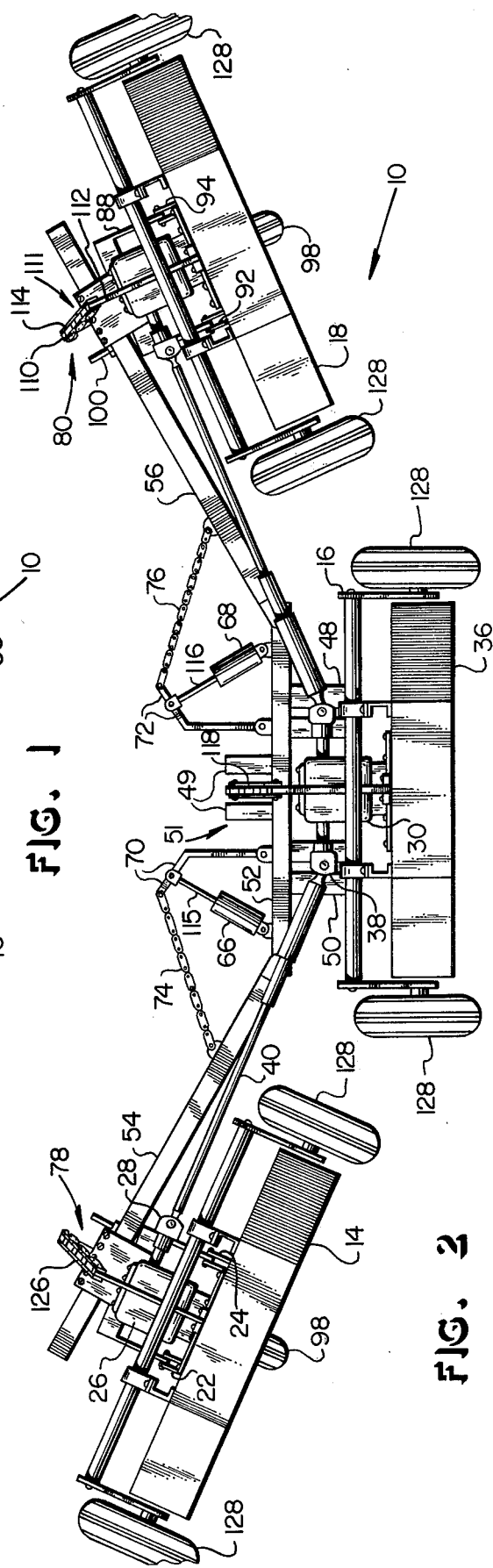
FIG. 1
FIG. 2

CROP SHREDDER APPARATUS AND ADAPTER

BACKGROUND OF THE INVENTION

This invention relates to a crop shredder apparatus and adapter.

In farming, after the harvest of some crops, such as maize or cane, it is desirable to perform an operation known as shredding. Portions of the plant still standing in the field are cut very close to the ground. This is done with a shredder, similar to a rotary mower, pulled along the crop rows by a tractor. The shredders are generally capable of cutting a strip about two rows wide, for the crops above.

The present invention treats the problem of combining several shredders to form an apparatus which will cut more rows on each pass. Some aspects of this problem have been dealt with in the design of mowers used to mow large plots, notably highway sidings. Features of such mowers can be seen, for example, in U.S. Pat. No. 3,135,079 to T. J. Dunn and No. 3,115,738 to J. F. Engler. Multiple mower devices such as the ones disclosed in these patents provide suitable solutions for the mowing tasks, but they do not meet all the needs of a crop shredding machine. The present invention, by contrast, provides a combination of features that make it particularly adapted to the operation of crop shredding.

SUMMARY OF THE INVENTION

In accordance with the present invention, there is provided an adapter for use with shredders and with a vehicle for towing the shredders. The resulting shredder apparatus includes a center shredder and at least one side shredder. Connection to the towing vehicle is made by a hitch on a center coupling assembly of the apparatus. The coupling assembly also has means for connecting to the center shredder, which means is pivotal on a first axis, approximately horizontal and transverse to the direction of towing. There is at least one side beam, disposed transverse to the direction of towing and connected at one of its ends to the coupling assembly, so as to pivot on a second axis, in the direction of towing. Mounted on the center coupling assembly are means for moving the beam, pivoting about the second axis, to a selected position and for holding it there. There is at least one side coupling assembly, including means for coupling the side shredder to the beam at a selected position along the beam. The latter means has the capability of pivoting about a third axis in the direction of towing and about a fourth axis approximately horizontal and transverse to the direction of towing.

In a preferred embodiment, there is a shredder on each side of the center shredder. At the front of each shredder, there are two of the attachment points of a three point hitch. There are three of the coupling assemblies, one associated with each shredder, and each having attachment means for connecting to the two attachment points of the shredder. These connections provide pivoting about the transverse axes. The side coupling assemblies each have adjustable means for connecting to one of two transverse beams at a selected position along the beam. This adjustable means pivots with respect to the attachment means, about the third axis. As a part of the height adjustment of the shredder, there is a gage wheel mounted on a vertical strut. The strut is held at a selected position along its length, on a frame projecting forward from the adjustable means. Each shredder has a flexible link from its associated coupling assembly to the rear of the shredder, which serves to limit the downward displacement of the rear, at times when the shredder apparatus is raised.

The basic advantage of the present invention is that it transforms an operation formerly performed two rows at a time into one that can readily cover six rows at a time, using three shredders. Important in this regard is a capability of adjusting the lateral position of the side shredders. The adjustment is made by selecting the position of the side coupling assembly along the beam. This allows the shredders to be positioned in best relationship to the crop rows. In particular, some farmers may choose one of three planting methods; namely, planting every row, planting two and skipping one, or planting two and skipping two. For any of these planting methods, the shredder apparatus according to the invention can be adjusted so that each of the shredders cuts two planted rows.

The shredder apparatus of the invention is well equipped to follow irregular contours of the ground. Movement of the bar about the second axis permits each shredder to operate at a somewhat different elevation. Each of the shredders pivots at its two attachment points, about axes approximately horizontal and transverse to the direction of towing. This enables them to roll up and down slopes well. Each side shredder also pivots about an axis in the direction of towing in order to conform to irregularities running transverse to that direction. It is important for the apparatus to have such a degree of motional freedom, because it undertakes to shred a wide path. A mower or shredder encompassing a relatively narrow path would encounter less irregularity within the cutting width.

In moving to and from a field, it becomes necessary to lift the shredder apparatus and decrease its effective width somewhat. The tractor hitch connected to the center coupling assembly is used to raise the entire shredder apparatus. In addition, the beams are pivoted upward with respect to the center shredder to decrease the width of the apparatus. Because each shredder pivots near its front, about a horizontal axis transverse to the towing direction, the rear of the shredder tends to remain down when the front is lifted. However, each shredder includes means for flexibly linking the rear of the shredder to the associated coupling assembly in such a manner that the rear can stay only so far below the front. In this way it is possible to raise and fold the apparatus for transporting, while maintaining a high freedom of motion for each shredder when it is being used for cutting.

BRIEF DESCRIPTION OF THE DRAWING

FIG. 1 is a plan view of a shredder apparatus according to the invention, with the adapter thereof illustrated with solid lines, and shredders shown in dotted outline.

FIG. 2 is a rear elevation of the shredder apparatus of FIG. 1, with side portions of the apparatus shown in a raised position.

DESCRIPTION OF PREFERRED EMBODIMENT

Figure 3:
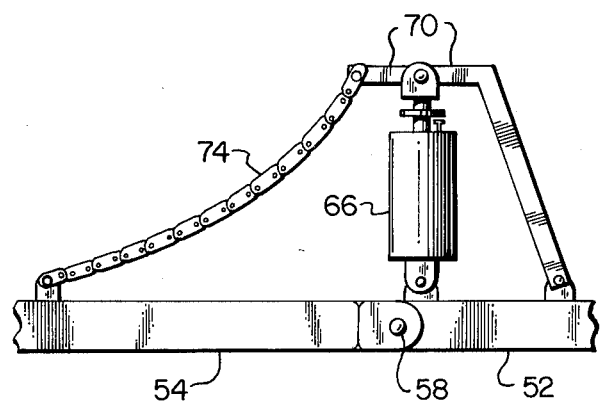
FIG. 3 is a partial elevation view of the apparatus of FIG. 1, for the cause in which side portions of the apparatus are in a lowered position.

FIG. 1 illustrates a shredder apparatus in accordance with the invention, indicated generally by the reference numeral 10. The apparatus 10 is composed of an adapter 12 and individual shredders 14, 16 and 18.

Each of shredders 14, 16 and 18 has been modified somewhat to accommodate the adapter 12. The nature of these modifications can be clarified by consideration of shredder 14, by way of example. In the unmodified condition, shredder 14, like the others, had a three point hitch for a tractor at the front 20 of the shredder. The top attachment point of the hitch has been removed, leaving only the two bottom attachment points 22 and 24, shown in FIG. 1. As originally configured, each shredder was built to be powered by a shaft from the power takeoff of a tractor pulling the shredder. The shaft was coupled to a gear box of the shredder to drive the cutter blades. As can be seen in FIG. 1, shredder 14 has a gear box 26, but it has been turned so that the coupliing 28 thereof faces to the side rather than the front 20 of the shredder. Shredder 18 has been modified in the same way as shredder 14. In shredder 16, the original gear box has been replaced by a gear box 30 that provides driving power to the other two shredders. Gear box 30 receives a drive shaft 32 from a towing vehicle, such as a tractor, by way of a universal coupling 34. Gear box 30 transmits the drive of shaft 32 to cutter blades (not shown) beneath housing 36. In addition, gear box 30 transmits power through universal joints 38 and conventional extensible drive shafts 40 to shredders 14 and 18.

Figure 6:
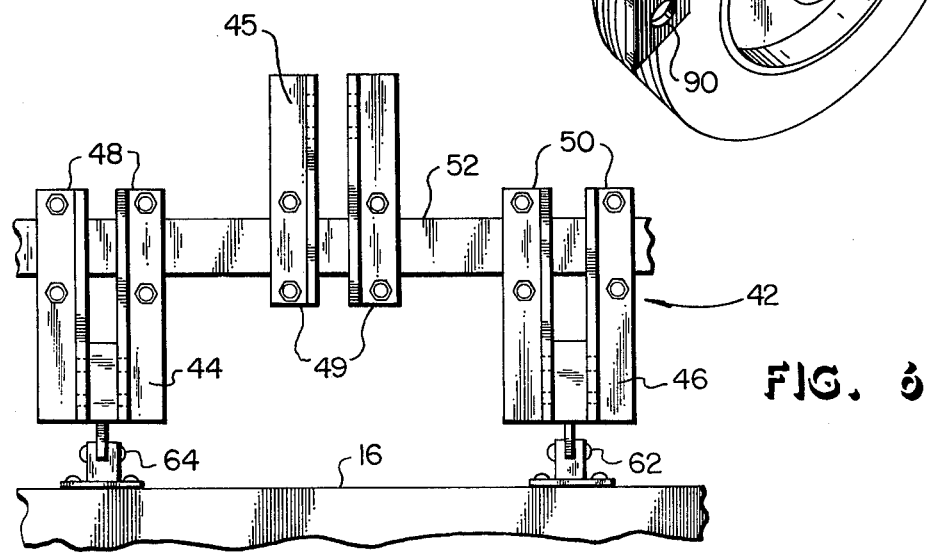
FIG. 6 is a partial front elevation of the apparatus of FIG. 1 showing means for coupling to a three point tractor hitch.

The shredder apparatus 10 is connected to the towing vehicle through a three point hitch 42. Portions of the hitch 42 are seen in FIG. 6, FIG. 1 and FIG. 2. Referring to FIG. 6, the three attachment points of the hitch 44, 45 and 46 are formed by pieces 48, 49 and 50 bolted to a bar 52. The hitch 42 and bar 52 are parts of a coupling assembly referred to by numeral 51. Bar 52 is a link in the connection to the side shredders 14 and 18. The connection to shredder 16 is at the bottoms of pieces 48 and 50, at attachment points 64 and 62 respectively of shredder 16.

As illustrated in FIG. 2, coupling assembly 51 has connected to it beams 54 and 56. Each of beams 54 and 56 is connected at an end thereof to bar 52, pivoted about axes at pins 58 and 60 which are aligned in the direction of towing of the apparatus 10. This pivoting allows side shredders 14 and 18 to be raised into the traveling position shown in FIG. 2. It also permits shredders 14, 16 and 18 to be operational at somewhat different elevations. It is not critical that the axes at pins 58 and 60 be exactly parallel to the direction of towing; an approximation of such an alignment can achieve the same objectives.

In FIG. 2, the apparatus for raising beams 54 and 56 and the side units attached thereto is shown to include hydraulic cylinders 66 and 68. The cylinders 66 and 68 are mounted on bar 52 to pivot in the plane of motion of beams 54 and 56. Arms 70 and 72 are similarly pivoted on bar 52, inboard of the cylinders. The piston rods 115 and 116 of cylinders 66 and 68 are pivotally attached to arms 70 and 72, respectively. Chains 74 and 76, which can be, for example, high speed chains, link the free ends of arms 70 and 72 with beams 54 and 56, respectively.

Side mowers 14 and 18 are connected to beams 54 and 56 by coupling assemblies indicated by the numerals 78 and 80, respectively. Assembly 80 is shown in detail in FIG. 5. There it can be seen that the connection to beam 56 is made by a pair of plates 82 and 84 connected by bolts 86. The position of assembly 80 along beam 56 can be varied by loosening bolts 86 and moving the assembly. In this manner, the transverse position of cutter 18 can be varied to accommodate various row spacings of crops. The part of assembly 80 which is connected to shredder 18 is member 88. The connection is made at holes 90 which are bolted into the two attachment points 92 and 94 at the front of shredder 18, as seen in FIG. 1. Member 88 is connected to plates 82 and 84 by pin 96, passing through the plates and member 88. The pin provides a pivotal connection about an axis generally in the direction of travel or towing of the apparatus 10.

Forward of mounting assembly 80 and of shredder 18 is a gage wheel 98. The wheel is mounted on a strut 100 which, in turn, is held in a sleeve 102. Set screws 104, which can be seen in FIG. 1 but not FIG. 5, hold strut 100 in sleeve 102 at a selected position along the length of the strut. Sleeve 102 is held by a clamp 108 on a frame 106 which projects forward from plate 84.

Projecting upward from the front of plate 84 is a member 110. It is one part of a linking apparatus 111 appearing in FIG. 1 and FIG. 2 that includes another upright member 112 at the rear of the shredder 18. Connecting the top of member 110 to the top of member 112 is a heavy chain 114. When shredder 18 is level from back to front, chain 114 is slack. However, when shredder 18 is raised as in FIG. 2, its rear stays down, the shredder rotating about attachment points 92 and 94. When chain 114 becomes tight, it limits the downward displacement of the rear portion relative to the front of the shredder and relative to coupling assembly 80.

Figure 4:
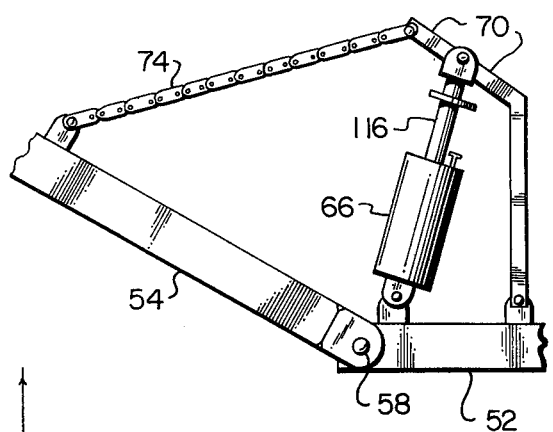
FIG. 4 is the view of FIG. 3, except that the side portion of the apparatus is in a raised position.

FIG. 3 shows the mechanism for raising beam 54, in a position suitable for normal shredding operation. If the shredder is operating on level ground and if all the shredders are adjusted for equal cutting height, the beam 54 will be horizontal as shown. In this position, the chain 74 is slack and does not support the beam. Beam 54 can rotate somewhat in the downward direction and to a considerable extent in the upward direction without restraint from the chain. FIG. 4 shows the hydraulic cylinder 66 activated from a line (not shown) coming, for example, from a tractor hydraulic unit. The piston rod 116 pushes up on arm 70 which, in turn, pulls on chain 74 toward the right of FIG. 4. This causes beam 54 to be raised, rotating about pin 58.

In operation, the apparatus 10 is taken to a field with shredders in the raised position of FIG. 2. Connection to a towing vehicle such as a tractor is made at three point hitch 42. The tractor hitch is then raised, lifting the front of shredder 16 off the ground. The rear of shredder 16 is held off the ground by linking apparatus 118, which is like apparatus 111 on shredder 18. Hydraulic cylinders 66 and 68 are maintained activated, thereby holding beams 54 and 56 raised with respect to bar 52. The front portion of shredder 18 is raised by virtue of the connection of coupling assembly 80 at attachment points 92 and 94. As previously described, linking apparatus 111 limits the amount that the rear of shredder 18 can hang below the front. The front of shredder 14 is similarly lifted at attachment points 22 and 24, while the rear is held by a linking apparatus 126.

In preparation for shredding, the tractor hitch is lowered, setting shredder 16 on the ground. Hydraulic cylinders 66 and 68 are deactivated, lowering shredders 14 and 18 to the ground. When towing begins, the pulling forces are applied to shredder 14 at attachment points 22 and 24, to shredder 16 at points 62 and 64, and to shredder 18 at points 92 and 94. Cutting height is determined by a conventional height adjustment of side wheels 128 and the vertical position of gage wheels 98 with respect to coupling assemblies 78 and 80. Torque from power take off shaft 32 is transmitted to shredding blades (not shown) by gear boxes 26 and 30 and shafts 40.

Figure 5:
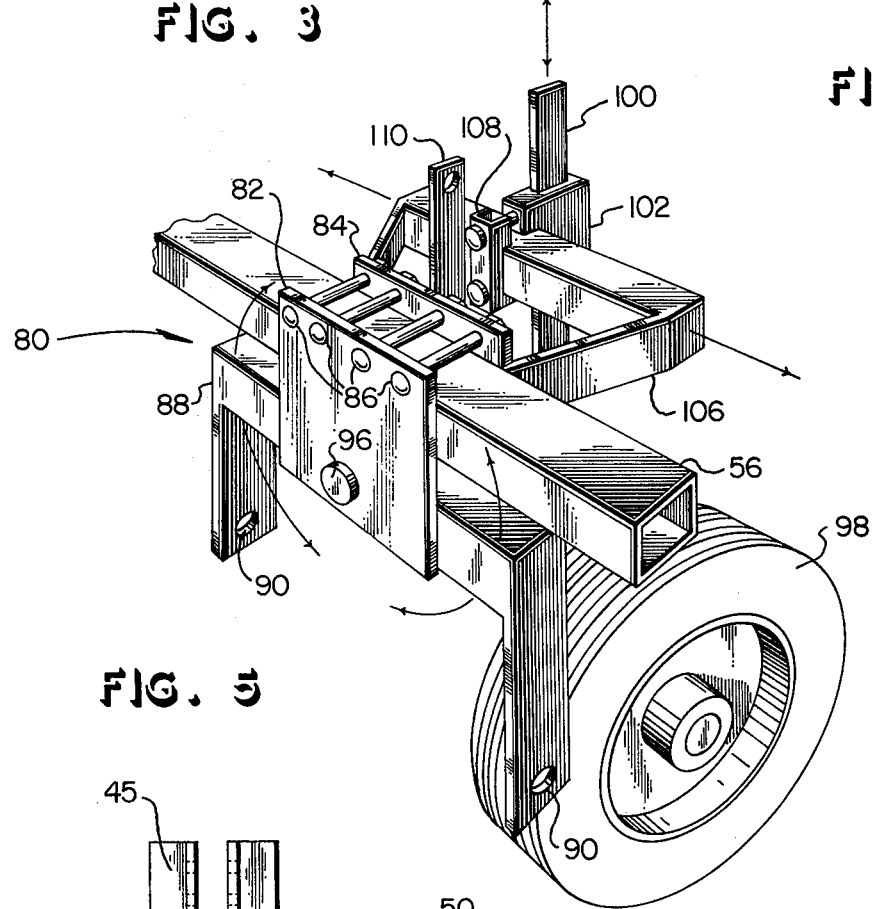
FIG. 5 is a partial perspective view of the apparatus of FIG. 1, showing a coupling assembly for the right hand side portion of the apparatus.

For best alignment with the crop rows to be shredded, adjustments are made of the positions of shredders 14 and 18 along beams 54 and 56. In both coupling assemblies 78 and 80, bolts such as bolts 86 in FIG. 5 are loosened to move the coupling assembly along the beam.

The shredder apparatus 10 has considerable capability to follow rough ground contours. Each of shredders 14, 16 and 18 pivots about its two attachment points connected to adapter 12. Each of attachment points 22, 24, 62, 64, 92 and 94 has a pivotal axis that is approximately horizontal and transverse to the direction of travel or towing of the apparatus. This allows all three shredders to readily follow slopes in the direction of travel. When the terrain requires that one of the shredders move to a somewhat different elevation from the others, it is possible, because beams 54 and 56 can rotate about the axes at pins 58 and 60. In addition, each of shredders 14 and 18 rotate about a pin-like pin 96 in FIG. 5, so that they may conform to irregularities that run transverse to the direction of travel.

Despite the high freedom of movement of shredders 14, 16 and 18, it has been possible in the present invention to provide for raising the shredders to a traveling position. This has been accomplished by the use of the linking apparatus 111, 118 and 126 which are slack and allow freedom of movement during normal operation, but limit the drop of the shredders during transport.

Although preferred embodiments of the invention have been described in detail, it is to be understood that various changes, substitutions and alterations can be made therein, without departing from the spirit and scope of the invention as defined by the appended claims.

I claim:

1. A shredder apparatus for connection to a vehicle for towing, comprising:
    first and second shredders;
    a first coupling assembly, including
        a hitch for connection to the towing vehicle,
        means for connecting to the first shredder and for pivoting on a first axis extending approximately horizontal and transverse to the direction of said towing;
        a beam, disposing transverse to the direction of said towing, and connected at one end to the coupling assembly, pivotal on the second axis extending in the direction of said towing;
        means mounted on the first coupling assembly for moving the beam, pivotal on said second axis, to a selected position, and holding the beam in the position;
    a second coupling assembly, including means for connecting to the second shredder and connecting to the beam at a selected position along the beam, and for pivoting about a third axis extending in the direction of said towing and about a fourth axis extending approximately horizotal and transverse to said direction;
    wherein said connecting by the coupling assemblies to the shredders is at forward portions of the shredders; and
    further including, for each one of the shredders, means for flexibility linking a rear portion of said one shredder with the one coupling assembly connected thereto and for thereby limiting downward displacement of said rear portion relative to said one coupling assembly.

2. An adapter for use with first and second shredders and with a vehicle for towing the shredders, comprising:
    a first coupling assembly, including
        a hitch for connection to the towing vehicle,
        means for connecting to the first shredder and for pivoting on a first axis extending approximately horizontal and transverse to the direction of said towing;
        a beam, disposed transverse to the direction of said towing, and connected at one end to the coupling assembly, pivotal on a second axis extending in the direction of said towing;
        means mounted on the first coupling assembly for moving the beam, pivotal on said second axis, to a selected position, and holding the beam in the position;
    a second coupling assembly, including means for connecting to the second shredder and connecting to the beam at a selected position along the beam, and for pivoting about a third axis extending in the direction of said towing and about a fourth axis extending approximately horizontal and transverse to said direction;
    wherein said connecting by the coupling assemblies to the shredders is at forward portions of the shredders; and
    further including for each one of the shredders, means for flexibility linking a rear portion of said one shredder with the one coupling assembly connected thereto and for thereby limiting downward displacement of said rear portion relative to said one coupling assembly.

3. An adapter for use with first and second shredders and with a vehicle for towing the shredders, comprising:
    a first coupling assembly, including
        a hitch for connection to the towing vehicle,
        means for connecting to the first shredder and for pivoting on a first axis extending approximately horizontal and transverse to the direction of said towing;
        a beam, disposed transverse to the direction of said towing, and connected at one end to the coupling assembly, pivotal on a second axis extending in the direction of said towing;
        means mounted on the first coupling assembly for moving the beam, pivotal on said second axis, to a selected position, and holding the beam in the position;
    a second coupling assembly, including means for connecting to the second shredder and connecting to the beam at a selected position along the beam, and for pivoting about a third axis extending in the direction of said towing and about a fourth axis extending approximately horizotal and transverse to said direction;

wherein said shredders to be adapted each have two, generally coaxial attachment points of a three point hitch, and wherein said means for connecting to the shredders connects to said two attachment points on each shredder; and wherein the second coupling assembly includes, first means for connecting to said two attachment points on the second shredder, pivotal about said fourth axis; second means for connecting to the beam at a selected position along the beam; means for pivoting said first means with respect to the second means, about said third axis; a wheel strut; a wheel mounted on the strut; and means projecting forward from the second means for holding the strut in an approximately vertical position.

4. A shredder apparatus for connection to a vehicle for towing, said shredder apparatus being adjustable to shred crops along a plurality of pairs of spaced apart rows, comprising:

first and second shredders;
a first coupling assembly, including
  a hitch for connection to the towing vehicle,
  means for connecting to the first shredder and for pivoting on a first axis extending approximately horizontal and transverse to the direction of said towing;
  a beam, disposed transverse to the direction of said towing, and connected at one end to the coupling assembly, pivotal on a second axis extending in the direction of said towing;
means mounted on the first coupling assembly for moving the beam, pivotal on said second axis, to a selected position, and holding the beam in the position; and
a second coupling assembly, including means for connecting to the second shredder and connecting to the beam at a selected position along the beam, and for pivoting about a third axis extending in the direction of said towing and about a fourth axis extending approximately horizontal and transverse to said direction;
said second shredder being positioned on said beam spaced apart from the first shredder to shred the crops on said spaced apart pairs of rows.

5. An adapter for use with first and second shredders and with a vehicle for towing the shredders, so that the shredders are spaced apart to shred crops along a plurality of spaced apart rows, comprising:

a first coupling assembly, including
  a hitch for connection to the towing vehicle,
  means for connecting to the first shredder and for pivoting on a first axis extending approximately horizontal and transverse to the direction of said towing;
a beam, disposed transverse to the direction of said towing, and connected at one end to the coupling assembly, pivotal on a second axis extending in the direction of said towing;
means mounted on the first coupling assembly for moving the beam, pivotal on said second axis, to a selected position, and holding the beam in the position;
a second coupling assembly, including means for connecting to the second shredder and connecting to the beam at a selected position along the beam, and for pivoting about a third axis extending in the direction of said towing and about a fourth axis extending approximately horizontal and transverse to said direction;
said second shredder being positioned on said beam spaced apart from the first shredder to shred the crops on said spaced apart pairs of rows.

6. The adapter of claim 5, wherein said connecting by the coupling assemblies to the shredders is at forward portions of the shredders.

7. The adapter of claim 6, further including,
a wheel; and
means mounted on the second coupling assembly for disposing the wheel forward of the second shredder and for adjusting the vertical position of the wheel with respect to said second assembly.

8. The adapter of claim 6, further including for each one of the shredders, means for flexibility linking a rear portion of said one shredder with the one coupling assembly connected thereto and for thereby limiting downward displacement of said rear portion relative to said one coupling assembly.

9. The adapter of claim 5,
wherein said shredders to be adapted each have two, generally coaxial attachment points of a three point hitch,
and wherein said means for connecting to the shredders connects to said two attachment points on each shredder.

10. The adapter of claim 9, wherein the second coupling assembly includes,
first means for connecting to said two attachment points on the second shredder, pivotal about said fourth axis;
second means for connecting to the beam at a selected position along the beam;
means for pivoting said first means with respect to the second means, about said third axis;
a wheel strut;
a wheel mounted on the strut; and
means projecting forward from the second means for holding the strut in an approximately vertical position.

* * * * *